United States Patent [19]

Schwerzel et al.

[11] Patent Number: 5,196,468

[45] Date of Patent: Mar. 23, 1993

[54] SOLVENT-FREE ADHESIVE COMPOSITION BASED ON AN AQUEOUS ACRYLATE LATEX

[75] Inventors: Thomas Schwerzel, Meckenheim; Peter Fickeisen, Dirmstein; Hans J. Neumann, Wachenheim, all of Fed. Rep. of Germany

[73] Assignee: BASF Aktiengesellschaft, Ludwigshafen, Fed. Rep. of Germany

[21] Appl. No.: 801,856

[22] Filed: Dec. 3, 1991

[30] Foreign Application Priority Data

Dec. 13, 1990 [DE] Fed. Rep. of Germany ....... 4039781

[51] Int. Cl.$^5$ ..................... C08L 93/04; C08L 13/02; C08K 5/06
[52] U.S. Cl. .................... 524/272; 524/271; 524/372; 524/376
[58] Field of Search ................ 524/272, 271, 372, 376

[56] References Cited

U.S. PATENT DOCUMENTS 4,654,388 3/1987 Lofgren ............................... 524/272

FOREIGN PATENT DOCUMENTS 0221461 5/1987 European Pat. Off. ............ 524/273

Primary Examiner—Paul R. Michl
Assistant Examiner—LaVonda DeWitt
Attorney, Agent, or Firm—Oblon, Spivak, McClelland, Maier & Neustadt

[57] ABSTRACT

An essentially solvent-free adhesive composition containing
A) an aqueous acrylate latex and
B) 30 to 150% by weight, based on the solids content of the acrylate latex A), of a mixture of
b1) 50 to 95% by weight, based on the mixture, of at least one tackifying resin and
b2) 5 to 50% by weight, based on the mixture, of a compound of the formula I $$R^1-O-(X-O)_n-R^2$$

where X is alkylene of 2 to 4 carbons, n is an integer from 1 to 8 and $R^1$ and $R^2$ are each hydrogen or aryl or alkaryl of 6 to 12 carbon atoms, where $R^1$ and $R^2$ are not both hydrogen, is prepared as described and used as adhesive for floor coverings.

6 Claims, No Drawings

SOLVENT-FREE ADHESIVE COMPOSITION BASED ON AN AQUEOUS ACRYLATE LATEX

The present invention relates to an essentially solvent-free adhesive composition containing A) an aqueous acrylate latex and
B) 30 to 150% by weight, based on the solids content of the acrylate latex A), of a mixture of
  b1) 50 to 95% by weight, based on the mixture, of at least one tackifying resin and
  b2) 5 to 50% by weight, based on the mixture, of a compound of the formula I $$R^1\text{-}O\text{-}(X\text{-}O)_n\text{-}R^2 \qquad \text{I}$$

where X is alkylene of 2 to 4 carbon atoms, n is an integer from 1 to 8 and $R^1$ and $R^2$ are each hydrogen or aryl or alkaryl of 6 to 12 carbon atoms, where $R^1$ and $R^2$ are not both hydrogen.

Conventional adhesive compositions used for floor coverings can be divided into 3 classes of product: Solvent-containing synthetic resin adhesives which are prepared from a rosin, such as balsam resin, a chalk and polyvinyl ethers, e.g. polyvinyl ethyl ethers, as plasticizer. These adhesives additionally contain 20–30% of organic solvents such as methanol, ethanol, ethyl acetate etc. and other hydrocarbons. These adhesives are widely used because they are easy to work, especially at low temperature, and generally provide a good quick bonding capacity and good adhesive strengths. A serious disadvantage of this class of adhesives is the large quantity of organic solvents The latter are released by evaporation during working and thus result in a considerable odor nuisance which, in some circumstances, may even lead to a health risk for the person laying the floor covering An additional point to note when working with these adhesives is that, owing to the evaporation, explosive solvent/air mixtures may be produced Another class of widely used adhesives comprises dispersion adhesives as are disclosed, for example, in DE-A 2 301 497 and EP-A 221 461. They are composed of an aqueous acrylate latex, balsam resin and fillers, the balsam resin once again being dissolved in a low-boiling organic solvent with a flash point which is usually below 55° C. The solvents used for these are purely organic solvents such as toluene or xylene. The solvent content in these systems is about 3–5% by weight. The solvents in these dispersion adhesives have an effect on the curing behavior of the adhesives (E. A. Theiling, Adhäsion, 1972, 428 et seq.).

Recent efforts have been directed at attempting to produce solvent-free adhesives in place of these dispersion adhesives, which still contain small amounts of solvents By solvent-free is meant in this case that only very high boiling solvents, sometimes even polymeric plasticizers, are used in place of the low-boiling flammable solvents. These systems are composed, for example, of a polymer dispersion, a rosin, which is incorporated in the form of a melt in a high boiler into the system, and fillers and other auxiliaries.

Thus, U.S. Pat. No. 4,654,388 describes a floor adhesive which is composed of a film-forming acrylate latex, filler, diethylene glycol monobutyl ether and, as tackifying resin, a mixture of rosin and ester thereof. These systems have the disadvantage that the resistance to heat is usually extremely low.

It is an object of the present invention to provide essentially solvent-free adhesive compositions which can easily be produced and do not have the above-mentioned disadvantages.

We have found that this object is achieved by the adhesive composition defined above.

We have also found a process for the production thereof and the use thereof as floor adhesives.

Essentially solvent-free adhesive compositions contain less than 2, preferably less than 0.5%, by weight of low-boiling organic solvents, i.e. those with a flash point below 100, preferably below 55° C., measured by the DIN 51758 method. Examples are toluene, xylene and ethanol.

The adhesive composition according to the invention has conventional solids contents and viscosities. The preferred solids content is from 60 to 85% by weight and the preferred viscosity is from 2 to 20 Pa·s at 23° C. The use of acrylate latices in adhesive compositions is generally known. A large proportion, generally more than 25% by weight, of the monomer units in the acrylate latex A) are acrylates and/or methacrylates of alcohols containing from 1 to 24 carbon atoms.

Preferred acrylate polymers are composed of
a) 70 to 99.5, specifically 85 to 99.5%, by weight of at least one monomer selected from the group comprising esters of acrylic and methacrylic acid with monoalcohols containing 1 to 24 carbon atoms, vinyl and allyl esters of carboxylic acids containing 1 to 20 carbon atoms, vinyl ethers of alcohols containing 1 to 8 carbon atoms, vinylaromatics, vinyl halides and non-aromatic hydrocarbons with 2 to 8 carbon atoms and at least one olefinic double bond,
b) 0.5 to 30, specifically 0.5 to 15%, by weight, based on the polymer, of at least one monomer selected from α,β-unsaturated mono- or dicarboxylic acids with 3 to 6 carbon atoms, the amides thereof, the esters thereof with hydroxy alcohols with up to 20 carbon atoms, which may contain ether groups, ethylenically unsaturated nitriles with 3 to 6 carbon atoms and olefinically unsaturated sulfonic acids with 2 to 6 carbon atoms and the salts thereof and
c) 0 to 5, specifically 0%, by weight of other copolymerizable monomers.

Suitable monomers a) are esters of acrylic or methacrylic acid with monoalcohols containing 1 to 24 carbon atoms, preferably monoalkanols. Examples are hexyl (meth)acrylate, lauryl or stearyl (meth)acrylate, cyclohexyl acrylate, phenylethyl methacrylate, methyl acrylate, ethyl acrylate and n-, s- and t-butyl (meth)acrylate, benzyl methacrylate, cyclohexyl methacrylate and, especially, methyl methacrylate, ethyl methacrylate, 2-ethylhexyl acrylate and n-butyl acrylate.

Also suitable are vinyl and allyl esters of carboxylic acids with 1 to 20 carbon atoms such as allyl acetate and allyl propionate, vinyl formate, laurate, stearate and, specifically, vinyl propionate and vinyl acetate.

Examples of vinyl ethers of alkanols with 1 to 8 carbon atoms are vinyl methyl ether, vinyl ethyl ether, vinyl isopropyl ether and vinyl butyl ether.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of non-aromatic hydrocarbons with 2 to 8 carbon atoms and at least one olefinic double bond are ethylene, propylene, n- and i-butene, butadiene, isoprene and chloroprene.

Monomers b) are acrylic acid, methacrylic acid, itaconic acid, maleic acid, fumaric acid, crotonic acid, acrylamide, methacrylamide, hydroxyalkyl (meth)acrylates such as 2-hydroxyethyl acrylate, 2-hydroxypropyl acrylate or hydroxybutyl acrylates, acrylonitrile, methacrylonitrile and vinylsulfonic acid or the sodium salt thereof, preferably acrylic acid, acrylamide, methacrylamide and acrylonitrile.

The total amounts by weight of the monomers involved in the structure of the acrylate polymer are preferably chosen so that polymer A has a glass transition temperature (Tg) of from $-60°$ C. to $0°$ C., preferably from $-50°$ C. to $-10°$ C. The glass transition temperature can be measured in a conventional manner, e.g. by measuring the modulus of elasticity in the creep test as a function of temperature (see A. Zosel, Farbe und Lack 82 (1976) 125-134). It is possible to predict the glass transition temperature from the amounts by weight of the monomers involved in the structure of a copolymer to a good approximation using the Fox equation (T.G. Fox, Bull. Am. Phys. Soc. (Ser. II) 1, 123 (1956)):

$$\frac{1}{Tg} = \frac{X^1}{Tg^1} + \frac{X^2}{Tg^2} + \ldots \frac{X^n}{Tg^n},$$

where $X^1, X^2, \ldots X^n$ are the weight fractions of monomers 1, 2, ... n and $Tg^1, Tg^2, \ldots Tg^n$ are the glass transition temperatures in Kelvin of the respective polymers composed only of one of the monomers 1, 2, ... or n. The glass transition temperatures of these homopolymers of the monomers specified above are essentially known and listed, for example, in J. Brandrup, E. H. Immergut, Polymer Handbook 1st Ed. J. Wiley, New York, 1966 and 2nd Ed. J. Wiley, New York, 1975.

The aqueous acrylate latices are generally prepared by the known methods of emulsion polymerization (see, for example, Houben-Weyl, Methoden der Org. Chemie, Georg Thieme Verlag, 4th Edition, volume E20 part I, 1987, pages 215 et seq.) using known emulsifiers and water-soluble initiators such as hydrogen peroxide or alkali metal persulfate, advantageously combined with water-soluble reducing agents such as formaldehyde sulfoxylate, thiosulfate, sodium pyrosulfite or ascorbic acid. The emulsifiers which can be employed are conventional anionic and, where appropriate, non-ionic dispersants in the conventional amounts which are from 0.5 to 6, in particular from 2 to 5%, by weight, based on the monomers. Examples of these are sodium lauryl sulfate, sodium dodecylbenzenesulfonate and the alkali metal salts of acid sulfates of the adducts of alkylene oxides with octyl- or nonylphenol, which usually contain from 5 to 50 mol of ethylene oxide and/or propylene oxide, and ethylene oxide adducts with fatty alcohols, usually with from 5 to 50 mol ethylene oxide. The emulsion polymerization can in general be carried out at from $30°$ to $150°$ C., in particular at from $50°$ to $90°$ C. It is additionally advantageous to prepare the latices in a pH range from 3 to 9 so that the dispersions are sufficiently stable to pH changes. The aqueous acrylate dispersions A) preferably contain both anionic and non-ionic emulsifiers of the types mentioned. In general, a polymer or solids content of from 40 to 65% by weight, measured by the DIN 53189 method, is obtained.

Mixture B) is preferably employed in amounts of from 70 to 130% by weight, based on the solids content of the acrylate latex A). Good results are obtained when from 60 to 95 and, in particular, 70 to 90% by weight of b1) and from 5 to 40, in particular 10 to 30%, by weight of b2), in each case based on the mixture B, are used.

Tackifying resins b1) are described in US-A 4 654 388. Preferred as b1) is rosin, such as balsam resins and derivatives thereof, especially balsam resin WW. This is a commercially available resin with a melting range from $60°$ to $80°$ C. It is also possible to employ mixtures of resins.

In the formula I of compound b2), $R^1$ is, for example, hydrogen,

X is, for example,

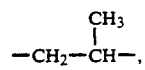

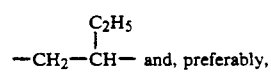 and, preferably,

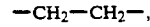

n is, for example, 2, 3 and, preferably, 1 and $R^2$ is, for example, phenyl.

Examples of compounds are

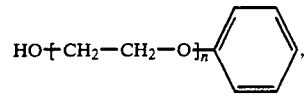

where n is 2 or 3 and, in particular, 1 (=monophenyl glycol).

Mixture B) is prepared by heating and, preferably, melting the resin b1) together with the compound b2), preferably with mechanical agitation, and then usually stirring at, in general, from $90°$ to $110°$ C. for from 0.5 to 5 hours to give the mixture B) which is generally homogeneous.

Preferred adhesive compositions contain from 50 to 350, in particular 150 to 250%, by weight, based on the solids content of the acrylate latex A, of at least one filler C). Suitable are chalks which have been precipitated and finely ground if necessary in a conventional manner and which have an average particle diameter of, in general, from 2 to 10 $\mu$m and/or silica flour normally with an average particle diameter of from 3 to 20 $\mu$m.

The composition can also contain conventional additives such as foam suppressants, e.g. based on mineral oils or silicones, and thickeners, e.g. based on (meth)acrylic acid (co)polymers, or plasticisers, e.g. polypropylene glycol alkylphenyl ethers.

The solvent-free adhesive composition can be produced in a large number of suitable ways. In many cases the aqueous acrylate latex A), which has been mixed, where appropriate, with additives or else water, is introduced into a mixer at from $10°$ to $90°$ C., preferably $10°$ to $60°$ C. and especially $15°$ to $40°$ C. Mixture B) in the molten state, i.e. generally at from $70°$ to $100°$ C., is introduced into this latex while stirring. On the kg scale customary in the laboratory, this is normally carried out a little at a time or continuously over the course of from 5 minutes to 3 hours. The distribution of the molten resin in the aqueous dispersion can be adjusted to achieve the required result by means of the stirring speed.

Subsequently, if necessary, filler C) is mixed in with stirring.

However, the incorporation can also be carried out by first mixing the dispersion with auxiliaries and fillers and subsequently incorporating component B.

The adhesive composition is very suitable for floor coverings. It is advantageous to store the composition at room temperature for at least 8 days after its production before it is used.

The adhesive can be applied to the substrate using, for example, a toothed applicator. After the customary period for evaporation, the floor covering is laid. The working properties of the novel adhesives resemble those of solvent-containing adhesives. The adhesive composition according to the invention has technical properties which are at a high level, such as peel strength, shear strength, wet bonding capacity and dry gripping capacity and a surprisingly high resistance to heat.

Parts and percentages specified in the following examples are by weight unless otherwise indicated.

B) 80 parts of balsam resin WW were melted in the presence of 20 parts of monophenyl glycol while stirring at 95° C. for 3 hours.

BC) The mixture BC was prepared for comparison in the same way as B) but employing an adduct of cresol and propylene oxide with about 25 propylene oxide units (Plastilit ® 3060 of BASF AG) in place of monophenyl glycol.

BC') Comparative mixture BC, was prepared in the same way as B) but employing diethylene glycol monobutyl ether in place of monophenyl glycol.

The following adhesive compositions of Examples 1 to 4 and of Comparative Tests 1C to 4C' were produced by the following general procedure:

Foam suppressant, thickener and, where appropriate, plasticizer are added to the stirred acrylate latex A) at 23° C. The hot (95° C.) mixture B (BC, BC') is then added while stirring over the course of 0.25 hour, and the mixture is stirred for a further 0.1 hour. The filler is then mixed in while stirring and further stirred for 0.1 hour.

The compositions are shown in Table 2.

TABLE 2

| | Adhesive compositions (parts by weight) | | | | | | | | |
|---|---|---|---|---|---|---|---|---|---|
| | Examples | | | | | | | | |
| Components | 1 | 1C | 2 | 2C | 3 | 3C | 4 | 4C | 4C' |
| A1 | 32.1 | 32.1 | | | | | | | |
| A2 | | | 30.8 | 30.8 | | | | | |
| A3 | | | | | 32.1 | 32.1 | | | |
| A4 | | | | | | | 35.0 | 35.0 | 35.0 |
| Thickener[1] | | | | | | | | | |
| 1% strength aqueous solution | 8.5 | 8.5 | 8.5 | 8.5 | 8.5 | 8.5 | 8.5 | | |
| 4% strength aqueous solution | | | | | | | | 8.5 | 8.5 |
| Foam suppressant[2] | 0.2 | 0.2 | 0.2 | 0.2 | 0.2 | 0.2 | 0.2 | 0.2 | 0.2 |
| B | 20 | | 20 | | 20 | | 20 | | |
| BC | | 20 | | 20 | | 20 | | 20 | |
| BC' | | | | | | | | | 20 |
| Filler[3] | 39.2 | 39.2 | 40.5 | 40.5 | 39.2 | 39.2 | 36.2 | 36.3 | 36.3 |

[1]Latekoll ® D (BASF AG)
[2]Lumiten ® EL (BASF AG)
[3]Chalk: Juraperle XM, average particle size 5.7 μm (supplied by Ulmer Füllstoffvertrieb)

EXAMPLES

The acrylate latices which were employed and were prepared by free radical emulsion polymerization in aqueous medium at 80° C. are specified in Table 1.

TABLE 1

| Monomer composition (% by weight) | | Solids content (% by weight) | Glass transition temperature (°C.) |
|---|---|---|---|
| A1 2-Ethylhexyl acrylate | 89 | | |
| Acrylonitrile | 8 | 60 | −53 |
| Acrylic acid | 3 | | |
| A2 n-Butyl acrylate | 89 | | |
| Vinyl acetate | 5 | | |
| Acrylonitrile | 3 | 65 | −40 |
| Hydroxyethyl acrylate | 2 | | |
| Acrylic acid | 1 | | |
| A3 n-Butyl acrylate | 40 | | |
| 2-Ethylhexyl acrylate | 29 | 60 | −21 |
| Vinyl acetate | 28 | | |
| Acrylic acid | 2 | | |
| A4 n-Butyl acrylate | 87 | | |
| Acrylonitrile | 10 | 55 | −21 |
| Acrylic acid | 3 | | |

Preparation of mixtures B)

EXAMPLE 4

The results of the following tests are set out in Table 3:

Peel strength by the DIN 16860 method
Shear strength by the DIN 16860 method
Wet bonding capacity The adhesive is applied at a rate of about 350–400 g/m² with a DIN knife to a cement fiber slab (e.g. Eternit ® 2000) (20×50 cm) in the direction of pulloff. After 10 minutes for evaporation, strips of needled felt (NBB) are placed in the bed of adhesive and pressed on with a 2.5 kg roller moved backwards and forwards 3 times. At the stated time intervals, the strips are pulled off with an apparatus to determine the increase in the peel resistance in N/5 cm.

Dry gripping capacity

The adhesive is applied at a rate of about 250–300 g/m² with a DIN knife to a cement fiber slab (e.g. Eternit ® 2000) (20×50 cm) in the direction of pulloff. After various times for evaporation, PVC strips (Pegulan ® B 1) are placed in the bed of adhesive and pressed on with a 2.5 kg roller moved backwards and forwards (3×). The strips are then pulled off with an apparatus and the peel resistance is determined in N/5 cm.

Resistance to heat

The adhesive is used to attach, after 5 minutes for evaporation, 5 test specimens (5×6 cm) in accordance with DIN 16860 to a cement fiber slab (e.g. Eternit ® 2000) which is then stored at 23° C. for 14 days. The specimens are then heated at 50° C. for 30 minutes and subsequently loaded with 2 kg and left in a circulating air oven at 50° C. until they become detached.

The time taken to become detached is indicated.

TABLE 3

| | Results of measurement | | | | | | | | |
|---|---|---|---|---|---|---|---|---|---|
| | 1 | 1C | 2 | 2C | 3 | 3C | 4 | 4C | 4C' |
| Peel strength | | | | | | | | | |
| 10 minutes | 15.4 | 12.2 | 27.7 | 26.0 | 29.0 | 23.8 | 24.5 | 19.1 | 23.2 |
| 60 minutes | 10.8 | 7.9 | 19.0 | 15.3 | 14.9 | 16.7 | 21.2 | 16.4 | 20.2 |
| Shear strength | 0.6 | 0.5 | 0.6 | 0.5 | 0.6 | 0.6 | 0.7 | 0.6 | 0.7 |
| Wet bonding capacity [N/5 cm] | | | | | | | | | |
| 0 minutes | | | | | 1 | 0 | 1 | 0 | |
| 10 minutes | | | | | 31 | 11 | 13 | 6 | |
| 20 minutes | | | | | 55 | 50 | 50 | 31 | |
| 30 minutes | | | | | 58 | 57 | 68 | 55 | |
| Dry gripping capacity [N/5 cm] | | | | | | | | | |
| 10 minutes | | | | | 20 | 14 | 27 | 19 | |
| 20 minutes | | | | | 52 | 45 | 57 | 20 | |
| 30 minutes | | | | | 60 | 51 | 38 | 14 | |
| 45 minutes | | | | | 59 | 30 | 27 | 8 | |
| Resistance to heat [minutes] | 16 | 7 | 87 | 15 | 48 | 37 | 181 | 48 | 95 |

We claim:

1. An essentially solvent-free adhesive composition containing less than 2% by weight of low-boiling organic solvent having a flash point below 100° C., comprising A) an aqueous acrylate latex and B) 30 to 150% by weight, based on the solids content of the acrylate latex A), of a mixture of b1) 50 to 95% by weight, based on the mixture, of at least one tackifying resin and b2) 5 to 50% by weight, based on the mixture, of a compound of the formula I $$R^1\text{-O-}(X\text{-O})_n\text{-}R^2 \qquad \text{I}$$

where X is alkylene of 2 to 4 carbons, n is an integer from 1 to 8 and $R^1$ and $R^2$ are each hydrogen or aryl or alkaryl of 6 to 12 carbon atoms, where $R^1$ $R^2$ are not both hydrogen.

2. An adhesive composition as claimed in claim 1, where $R^1$ is hydrogen, X is —$(CH_2)_2$—, n is 1–3 and $R^2$ is phenyl.

3. An adhesive composition as claimed in claim 1, additionally containing from 50 to 250% by weight, based on the solids content of the acrylate latex A), of at least one filler C).

4. A process for the production of an adhesive composition as claimed in claim 1, which comprises mixing the tackifying resin b1) with b2), heating this mixture and subsequently stirring it into the acrylate latex which is at from 10° to 90° C.

5. A process for the production of an adhesive composition as claimed in claim 3, which comprises mixing the tackifying resin b1) with b2), heating this mixture and subsequently stirring it into the acrylate latex which is at from 10° to 90° C., and, in another step, incorporating the filler C).

6. An adhesive composition as claimed in claim 1, containing less than 0.5% by weight of low-boiling organic solvent.

* * * * *